United States Patent
Olesen et al.

(10) Patent No.: US 7,453,964 B2
(45) Date of Patent: *Nov. 18, 2008

(54) WIRELESS COMMUNICATION APPARATUS USING FAST FOURIER TRANSFORMS TO CREATE, OPTIMIZE AND INCORPORATE A BEAM SPACE ANTENNA ARRAY IN AN ORTHOGONAL FREQUENCY DIVISION MULTIPLEXING RECEIVER

(75) Inventors: Robert Lind Olesen, Huntingdon, NY (US); Alexander Reznik, Titusville, NJ (US); Philip J. Pietraski, Huntington Station, NY (US); Rui Yang, Greenlawn, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/586,415

(22) Filed: Oct. 25, 2006

(65) Prior Publication Data

US 2007/0041460 A1 Feb. 22, 2007

Related U.S. Application Data

(63) Continuation of application No. 10/991,557, filed on Nov. 18, 2004, now Pat. No. 7,164,740.

(60) Provisional application No. 60/523,939, filed on Nov. 21, 2003.

(51) Int. Cl.
*H04B 1/02* (2006.01)

(52) U.S. Cl. .................................. 375/347; 375/267
(58) Field of Classification Search ................ 375/219, 375/259, 260, 267, 347; 455/272, 273, 561, 455/562.1, 63.4, 562; 370/203, 210, 480
See application file for complete search history.

(56) References Cited

U.S. PATENT DOCUMENTS

| 3,803,618 | A | 4/1974 | Coleman |
| 5,218,359 | A | 6/1993 | Minamisono |
| 6,052,605 | A | 4/2000 | Meredith et al. |
| 6,438,389 | B1 | 8/2002 | Sandhu et al. |
| 6,470,055 | B1 | 10/2002 | Feher |

(Continued)

OTHER PUBLICATIONS

Nester, "The Fast Fourier Transform and the Butler Matrix", IEEE Transactions on Antennas and Propagation, May 1968, p. 360.

(Continued)

*Primary Examiner*—Betsy L Deppe
(74) *Attorney, Agent, or Firm*—Volpe and Koenig, P.C.

(57) ABSTRACT

A wireless communication apparatus which uses fast Fourier transforms (FFTs) in an orthogonal frequency division multiplexing (OFDM) receiver which incorporates a beam space antenna array. The beam space antenna array may be implemented with a Butler matrix array. The beam space antenna array may be a circular array, vertical array, or a combination of both circular and vertical arrays, for providing the desired angular antenna coverage. In one embodiment, the antenna array is optimized because the FFTs are linear invariant transform operators, whereby the order of operations in the OFDM receiver can be interchanged.

11 Claims, 2 Drawing Sheets

U.S. PATENT DOCUMENTS

| | | | |
|---|---|---|---|
| 6,549,762 | B1 | 4/2003 | Hirabe |
| 6,611,231 | B2 | 8/2003 | Crilly et al. |
| 6,771,988 | B2 | 8/2004 | Matsuoka et al. |
| 6,879,845 | B2 | 4/2005 | Suzuki et al. |
| 6,992,622 | B1 | 1/2006 | Chiang et al. |
| 7,079,809 | B1 | 7/2006 | Scherzer |
| 7,164,740 | B2 * | 1/2007 | Olesen et al. ............... 375/347 |
| 2002/0039347 | A1 | 4/2002 | Matsugatani et al. |
| 2002/0102950 | A1 | 8/2002 | Gore et al. |
| 2003/0087673 | A1 | 5/2003 | Walton et al. |
| 2003/0156570 | A1 | 8/2003 | Alamouti et al. |
| 2003/0157954 | A1 | 8/2003 | Medvedev et al. |
| 2003/0185326 | A1 | 10/2003 | Kolze |
| 2003/0228857 | A1 | 12/2003 | Maeki |
| 2003/0235149 | A1 | 12/2003 | Chan et al. |
| 2004/0001554 | A1 | 1/2004 | Sun et al. |
| 2004/0108961 | A1 | 6/2004 | Hay et al. |
| 2004/0196834 | A1 | 10/2004 | Ofek et al. |
| 2004/0198452 | A1 | 10/2004 | Roy |
| 2005/0085195 | A1 | 4/2005 | Tong et al. |

OTHER PUBLICATIONS

Brown, "The Uniqueness of the Butler Matrix as a Commutating Switch", IEEE Transactions on Antennas and Propagation, Sep. 1971, pp. 694-695.

Fujii, "Pseudo-Orthogonal Multibeam-Time Transmit Diversity for OFDM-CDMA", IEEE, 2002, pp. 222-226.

Becker et al., "Efficent Implementation of UTRA-TDD Multiuser Detector," 2002 World Wireless Congress, ISSN No. 1529-2592, pp. 504-509.

De Francisco et al., "A Novel Reduced Complexity EM-Based Receiver with Joint Interative Channel Estimation and Decoding for OFDM Systems," 41$^{st}$ Annual Allerton Conference (Oct. 2003).

Du et al., "Channel Estimation for D-Blast OFDM Systems," IEEE Global Telecommunications Conference (2002).

Foschini, "Layered Space-Time Architecture for Wireless Communication in a Fading Environement When Using Multi-Element Antennas," Bell Labs Technical Journal, (1996).

Golden et al., "Detection Algorithm and Initial Laboratory Results Using V-Blast Space-Time communication architecture," Electronic Letters, vol. 35, No. 1 (Jan. 1999).

Klein et al., "Linear Unbiased Data Estimation in Mobile Radio Systems Applying CDMA," IEEE Journal on Selected Areas in Communications, vol. 11 (Sep. 1993).

Klein, "Zero forcing and minimum mean square-error equalization for multiuser detection in code-division multiple-access channels," IEEE Trans. On Vehicular Technology, vol. 45, No. 2 (May 1996).

Latinovic et al., "A Wideband Space-Time Model for MIMO Mobile Fading Channels," WCNC 2003 pp. 324-342.

Sheleg, "A matrix-fed circular array for continuous scanning," Proc. IEEE, vol. 56 pp. 2016-2027 (Nov. 1968).

Shelton et al., "Reflective Butler Matrices," IEEE Transactions on Antennas and Propagation, vol. AP-27, No. 5 (Sep. 1979).

Shelton, "Fast Fourier transforms and Butler matrices," Proc. IEEE vol. 56, No. 3, p. 350 (Mar. 1968).

Tan et al., "OFDM Peak to Average Power Ratio Reduction by Combine Symbol Rotation and Inversion with Reduced Complexity," Globecom 2003, Dec. 1-5, 2003.

Wolniansky et al., "V-Blast: An Architecture for Realizing Very High Data Rates Over the Rich-Scattering Wireless Channel", 1998.

Wu et al., "A Phase Noise Suppression Algorithm for OFDM Based WLANs," IEEE Communications LEetters, vol. 6, No. 12, pp. 535-537 (Dec. 2002).

Wu et al., "OFDM Systems in Presence of Phase Noise, Consequences and Solutions," IEEE Trans. On Communications, vol. 52, No. 11, Nov. 2004.

* cited by examiner

US 7,453,964 B2

WIRELESS COMMUNICATION APPARATUS USING FAST FOURIER TRANSFORMS TO CREATE, OPTIMIZE AND INCORPORATE A BEAM SPACE ANTENNA ARRAY IN AN ORTHOGONAL FREQUENCY DIVISION MULTIPLEXING RECEIVER

CROSS REFERENCE TO RELATED APPLICATION

This application is a continuation of U.S. patent application Ser. No. 10/991,557, filed Nov. 18, 2004, which issued as U.S. Pat. No. 7,164,740 on Jan. 16, 2007, which claims the benefit of U.S. Provisional Application No. 60/523,939, filed Nov. 21, 2003, which are incorporated by reference as if fully set forth herein.

FIELD OF INVENTION

The present invention relates to a wireless communication system. More particularly, the present invention relates to wireless communication apparatus using Fast Fourier Transforms (FFTs) to create, optimize and incorporate a beam space antenna array in an Orthogonal Frequency Division Multiplexing (OFDM) receiver.

BACKGROUND

Improving the capacity of a wireless communication system is perhaps one of the most important areas in cellular technology that requires further exploration. Deficiencies in the spectral efficiency and power consumption of mobile systems have motivated wireless communication system designers to explore new areas in the technology that will offer capacity relief. One of these new areas is the use of antenna arrays in wireless systems to improve system capacity.

Antenna arrays deal with using multiple antenna elements at a receiver and/or transmitter to improve the capacity of the system. For example, using multiple antennas in a wireless receiver offers diversity of received signals. This proves to work well in fading environments and multi-path environments, where one path of a signal received by one antenna of the receiver may be subjected to difficult obstacles. In this scenario, the other antennas of the receiver receive different paths of the signal, thus increasing the probability that a better component of the signal, (i.e., a less corrupt version of the signal), may be received.

One of the challenges facing the use of antenna arrays is that they usually require a high degree of computational complexity. This is because the system will attempt to process each signal at each antenna by a separate digital baseband processing element which may lead to excessive power consumption, hardware resources, and processing time.

OFDM is a technology that is being considered by different industry drivers for use in many different communications applications, including antenna arrays. It is desired to find ways to reduce the complexity of antenna array receiver systems using OFDM technology.

SUMMARY

The present invention is related to wireless communication apparatus which uses FFTs in an OFDM receiver which incorporates a beam space antenna array. The beam space antenna array may be implemented with a Butler matrix array. The beam space antenna array may be a circular array, vertical array, or a combination of both circular and vertical arrays, for providing the desired angular antenna coverage.

The present invention implements an OFDM receiver and beam space antenna array by re-using FFTs in an efficient manner. The antenna array is optimized because the FFTs are linear invariant transform operators, whereby the order of operations in the present invention can be interchanged.

BRIEF DESCRIPTION OF THE DRAWINGS

A more detailed understanding of the invention may be had from the following description of a preferred embodiment, given by way of example and to be understood in conjunction with the accompanying drawing wherein.

DETAILED DESCRIPTION OF THE PREFERRED EMBODIMENT(S)

The present invention provides wireless communication apparatus which implements an OFDM receiver including a beam space antenna array, such as a Butler matrix array. A Butler matrix array is equivalent to an FFT processor implemented at the baseband.

The apparatus may include an OFDM receiver, a wireless transmit/receive unit (WTRU), a base station or an integrated circuit (IC).

Hereafter, the terminology "WTRU" includes but is not limited to a user equipment (UE), a mobile station, a fixed or mobile subscriber unit, a pager, or any other type of device capable of operating in a wireless environment.

When referred to hereafter, the terminology "base station" includes but is not limited to a Node-B, a site controller, an access point or any other type of interfacing device in a wireless environment.

The features of the present invention may be incorporated into an IC or be configured in a circuit comprising a multitude of interconnecting components.

In its simplest form, the number of beams that may be generated is equal to the number of antenna elements in the antenna array. The antenna array may provide any desired angular coverage. The angular coverage of the antenna array may include a circular array, which provides 360 degrees of simultaneous coverage.

In accordance with a preferred embodiment of the present invention, the OFDM receiver uses an FFT in its implementation for demodulation of a number of carriers. Each carrier is then independently modulated by a desired modulation scheme, such as Quadrature Phase Shift Keying (QPSK), Quadrature Amplitude Modulation (QAM), or the like. The signals received by the OFDM receiver are processed using the antenna array.

Figure 1:
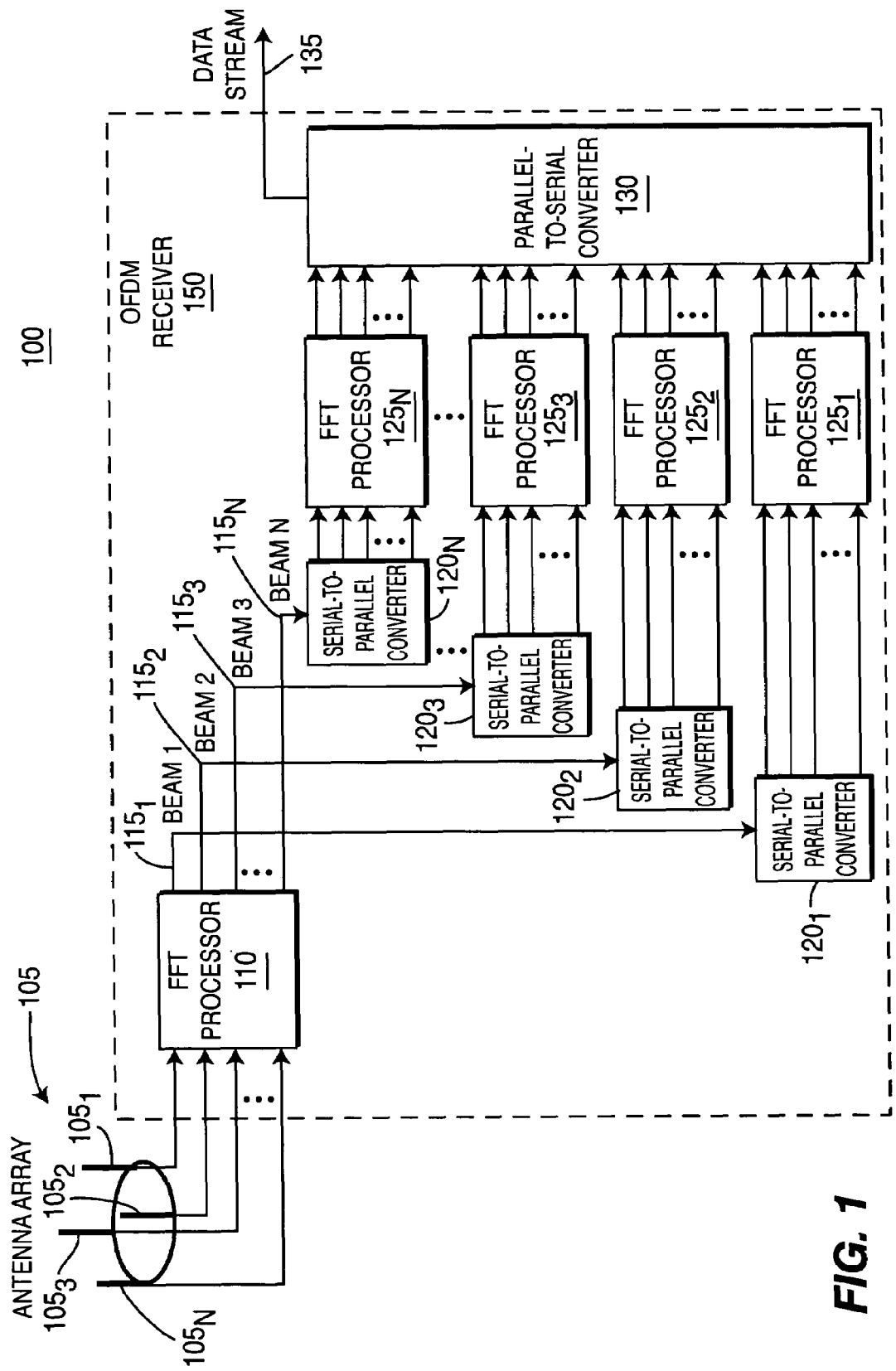
FIG. 1 shows a multiple beam OFDM receiver architecture in accordance with a preferred embodiment of the present invention.

FIG. 1 shows one embodiment of a multiple beam OFDM architecture 100 used to implement FFT re-use in an OFDM receiver and antenna array. As shown in FIG. 1, the OFDM architecture 100 includes an antenna array 105 including a plurality of antenna elements $105_1, 105_2, 105_3, \ldots, 105_N$, the outputs of which are fed to an OFDM receiver 150. It should be understood that the number of elements used by the antenna array 105 may vary.

The OFDM receiver 150 includes a first stage FFT processor 110, a plurality of serial-to-parallel (S/P) converters $120_1, 120_2, 120_3, \ldots, 120_N$, N second stage FFT processors, $125_1$, $125_2$, $125_3$, ..., $125_N$, and, optionally, a parallel-to-serial (P/S) converter 130 which outputs a single serial data stream 135.

The first stage FFT processor 110 receives a plurality of beam signals from the antenna elements $105_1$, $105_2$, $105_3$, ..., $105_N$, respectively. The first stage FFT processor 110 performs antenna processing on the beam signals so as to separate spatial beams 1 through N which can be processed independently.

In one embodiment, the antenna array 105 is a circular array which provides full azmuthal coverage. In another embodiment, the antenna array 105 is a vertical array which provides only elevational coverage. In yet another embodiment, a combination of both a circular and vertical antenna array may be used, provided there are at least two, or preferably four or more, antenna elements in each azmuthal or elevation plane. The signals from the antenna array 105 are processed by the first stage FFT processor 110, which may be a Butler matrix.

The first stage FFT processor 110 performs a beam space operation on the antenna signal vector, as described by Equation (1):

$$Y = w^H V^H X \qquad \text{equation}(1)$$

where Y is the concatenated signal vectors received from antenna elements $105_1$, $105_2$, $105_3$, ..., $105_N$, for N antenna elements, $w^H$ is the Hermitian of a weight vector which performs an optional windowing function, which may be used to reduce sidelobes of regions outside of the beam space angular region. $V^H$ is the Hermitian of the Butler (FFT) matrix which transforms the antenna signal vector X from element space to Y in beam space. The Butler matrix transforms the signal from element, or Cartesian space to beam space, or angular space. By transforming to beam space, it is possible to operate on signals which arrive within an angular spatial region directly, rather than indirectly in the element space by using some arbitrary cost function. In other words, the channel as perceived by the receiver is transformed to exhibit an angular dependency, rather than a Cartesian dependency, which is the same dependency that the received signals have.

The Butler (FFT) matrix is defined by Equation (2) as follows:

$$v_m^H = \frac{1}{N} \frac{\sin\left(\frac{N}{2}\left(\vartheta - m\frac{2\pi}{N}\right)\right)}{\sin\left(\frac{1}{2}\left(\vartheta - m\frac{2\pi}{N}\right)\right)} \qquad \text{Equation (2)}$$

where θ is the m'th beam's pointing angle and N is assumed to be even.

Figure 2:
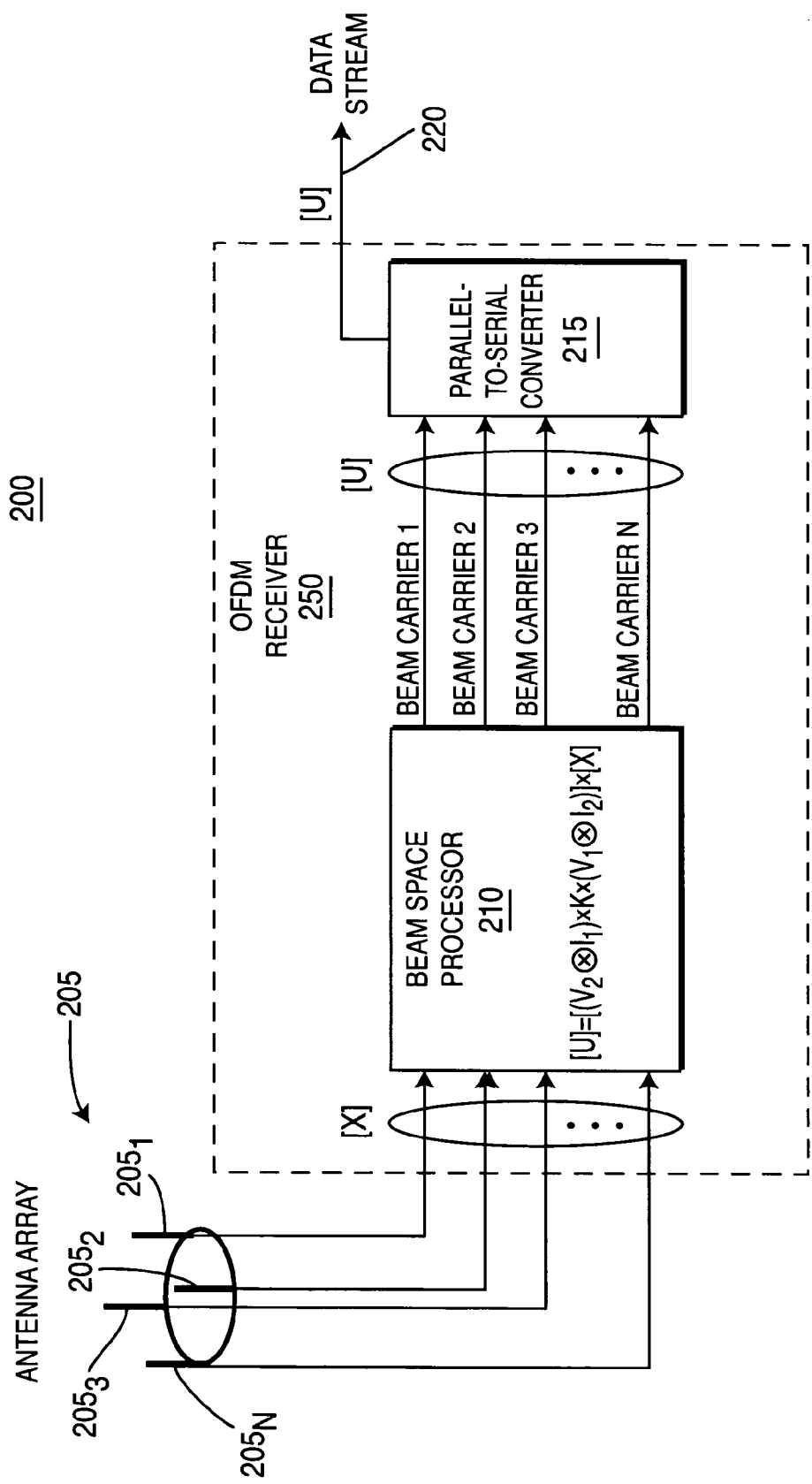
FIG. 2 shows a simplified architecture of the OFDM receiver architecture of FIG. 1.

The FFT processors 110, $125_1$, $125_2$, $125_3$, ..., $125_N$, shown in FIG. 1, may be consolidated into a single beam space processor 210, as shown in FIG. 2, using a simpler linear operation as described by the following Equation (3):

$$[U] = [(V_2 \otimes I_1) \times K \times (V_1 \otimes I_2)] \times [X] \qquad \text{equation}(3)$$

where $V_2$ is an M×M Fourier matrix for M sub-carriers, ⊗ is a Kronecker product, and $I_1$ is an N×N identity matrix. K is a bit reordering matrix which is determined by the size of $V_2$, $V_1$ is an N×N Fourier matrix for N antenna elements and $I_2$ is an M×M identity matrix.

The capacity C of an OFDM system without a beam space operation is determined by Equation (4):

$$C = \log_2 \det\left(I_N + \frac{E_s}{M_T N_o} H H^H\right) \qquad \text{Equation (4)}$$

where I is the identity matrix of size N×N, $E_s/M_t$ is the energy per symbol per antenna, $N_o$ is the noise power spectral density, and H is the channel matrix of dimension $M_R$ by $M_T$ for R receive antenna and T transmit antennas. In accordance with the present invention, Equation (5) determines the capacity C of an OFDM system which performs a beam space operation, (i.e., OFDM architecture 100), as follows:

$$C = \log_2 \det\left(I_N + \frac{E_s}{M_T N_o} H H^H V^H\right). \qquad \text{Equation (5)}$$

Since V is an ortho-normal matrix, Equation (5) may be rewritten as:

$$C = \log_2 \det\left(I_N + \frac{E_s}{M_T N_o} \lambda\right) \qquad \text{Equation (6)}$$

where λ is the eigen-decomposition of the modified channel matrix $HH^H V^H$. As a result, the rank of the modified channel may be optimized by weighting beams appropriately. Either of the outputs of the first stage FFT processor 110 shown in FIG. 1 and the beam space processor 210 shown in FIG. 2 may be weighted using maximum ratio combining by estimating the signal-to-noise ratio (SNR) of each beam output.

The first stage FFT processor 110 outputs beams $115_1$, $115_2$, $115_3$, ..., $115_N$, to the S/P converters $120_1$, $120_2$, $120_3$, ..., $120_N$, respectively, which output respective signals, (i.e., M sub-carriers), to the second stage FFT processors $125_1$, $125_2$, $125_3$, ..., $125_N$, which convert each the signals associated with the beams $115_1$, $115_2$, $115_3$, ..., $115_N$, into the frequency domain for further signal processing, (e.g., minimum mean square error (MMSE) equalization, zero-forcing (ZF) equalization, matched filtering, or the like). The outputs of the second stage FFT processors $125_1$, $125_2$, $125_3$, ..., $125_N$ are optionally fed to the P/S converter 130 which serializes the parallel FFT outputs to form a single output data stream 135.

FIG. 2 shows a simplified multiple beam OFDM architecture 200 used to optimize and implement FFT re-use in an OFDM receiver 250 and an antenna array 205, in accordance with another embodiment of the present invention. Similar to the OFDM architecture shown in FIG. 1, the OFDM architecture 200 shown in FIG. 2 includes an antenna array 205 including N antenna elements $205_1$, $205_2$, $205_3$, ..., $205_N$, the outputs of which are fed to an OFDM receiver 250.

The OFDM receiver 250 includes a beam space processor 210, which performs a bit reordering operation, and an optional P/S converter 215 which receives N parallel beam carrier signals from the beam space processor 210 derived from signals received from the N antenna elements $205_1$, $205_2$, $205_3$, ..., $205_N$, and serializes the signals to form a single output data stream 220. The bit reordering operation changes the order of operations such that only one beam space processor 210 is required. The beam space processor 210 uses an interleaving operation to reduce the complexity of the beam space OFDM receiver. The beam space processor uses an FFT to implement a Butler matrix. The OFDM architecture 200 shown in FIG. 2 essentially performs the same functions as the OFDM architecture 100 shown in FIG. 1, but in a more efficient and less complex manner.

While this invention has been particularly shown and described with reference to preferred embodiments, it will be understood by those skilled in the art that various changes in form and details may be made therein without departing from the scope of the invention described hereinabove.

What is claimed is:

1. A wireless communication apparatus configured to perform fast Fourier transforms (FFTs) on received signals so as to separate spatial beams derived from the received signals and process each beam independently, wherein the number of spatial beams is N, the apparatus comprising:
    a first stage FFT processor configured to perform at least one FFT function on the received signals and output the N separate spatial beams;
    N serial-to-parallel (S/P) converters, each S/P converter being configured to receive a respective one of the separate spatial beams;
    N second stage FFT processors in communication with respective ones of the plurality of S/P converters; and
    a parallel-to-serial (P/S) converter in communication with each of the second stage FFT processors, wherein the P/S converter is configured to output a data stream based on beam signals processed by each of the second stage FFT processors.

2. The apparatus of claim 1 wherein the first stage FFT processor uses a Butler matrix.

3. An integrated circuit (IC) configured to perform fast Fourier transforms (FFTs) on received signals so as to separate spatial beams derived from the received signals and process each beam independently, wherein the number of spatial beams is N, the IC comprising:
    a first stage FFT processor configured to perform at least one FFT function on the received signals and output the N separate spatial beams;
    N serial-to-parallel (S/P) converters, each S/P converter being configured to receive a respective one of the separate spatial beams;
    N second stage FFT processors in communication with respective ones of the plurality of S/P converters; and
    a parallel-to-serial (P/S) converter in communication with each of the second stage FFT processors, wherein the P/S converter is configured to output a data stream based on beam signals processed by each of the second stage FFT processors.

4. The IC of claim 3 wherein the first stage FFT processor uses a Butler matrix.

5. An wireless transmit/receive unit (WTRU) used to perform fast Fourier transforms (FFTs) on received signals so as to separate spatial beams derived from the received signals and process each beam independently, wherein the number of spatial beams is N, the WTRU comprising:
    a first stage FFT processor configured to perform at least one FFT function on the received signals and output the N separate spatial beams;
    N serial-to-parallel (SIP) converters, each S/P converter being configured to receive a respective one of the separate spatial beams;
    N second stage FFT processors in communication with respective ones of the plurality of S/P converters; and
    a parallel-to-serial (P/S) converter in communication with each of the second stage FFT processors, wherein the P/S converter is configured to output a data stream based on beam signals processed by each of the second stage FFT processors.

6. The WTRU of claim 5 wherein the first stage FFT processor uses a Butler matrix.

7. A receiver used to perform fast Fourier transforms (FFTs) on received signals so as to separate spatial beams derived from the received signals and process each beam independently, wherein the number of spatial beams is N, the receiver comprising:
    a first stage FFT processor configured to perform at least one FFT function on the received signals and output the N separate spatial beams;
    N serial-to-parallel (SJP) converters, each S/P converter being configured to receive a respective one of the separate spatial beams;
    N second stage FFT processors in communication with respective ones of the plurality of S/P converters; and
    a parallel-to-serial (PIS) converter in communication with each of the second stage FFT processors, wherein the P/S converter is configured to output a data stream based on beam signals processed by each of the second stage FFT processors.

8. The receiver of claim 7 wherein the first stage FFT processor uses a Butler matrix.

9. The receiver of claim 7 wherein the receiver is an orthogonal frequency division multiplexing (OFDM) receiver.

10. A base station used to perform fast Fourier transforms (FFTs) on received signals so as to separate spatial beams derived from the received signals and process each beam independently, wherein the number of spatial beams is N, the base station comprising:
    a first stage FFT processor configured to perform at least one FFT function on the received signals and output the N separate spatial beams;
    N serial-to-parallel (SIP) converters, each S/P converter being configured to receive a respective one of the separate spatial beams;
    N second stage FFT processors in communication with respective ones of the plurality of S/P converters; and
    a parallel-to-serial (P/S) converter in communication with each of the second stage FFT processors, wherein the P/S converter is configured to output a data stream based on beam signals processed by each of the second stage FFT processors.

11. The base station of claim 10 wherein the first stage FFT processor uses a Butler matrix.

* * * * *

UNITED STATES PATENT AND TRADEMARK OFFICE
CERTIFICATE OF CORRECTION

PATENT NO.       : 7,453,964 B2
APPLICATION NO.  : 11/586415
DATED            : November 18, 2008
INVENTOR(S)      : Olesen et al.

Page 1 of 1

It is certified that error appears in the above-identified patent and that said Letters Patent is hereby corrected as shown below:

At column 3, delete "Equation (2)" and insert therefor $$-- v_m^H = \frac{1}{N} \frac{\sin\left(\frac{N}{2}\left(\vartheta - m\frac{2\pi}{N}\right)\right)}{\sin\left(\frac{1}{2}\left(\vartheta - m\frac{2\pi}{N}\right)\right)} --.$$

At column 3, line 54, after the word "where" delete "θ" and insert therefor --$\vartheta$--.

At column 4, line 9, before the words "is the" delete "$E_s/M_t$" and insert therefor -- $E_s/M_\tau$ --.

At column 4, line 41, after the word "each" insert --of--.

At claim 7, column 6, line 21, before the word "converters" delete "(SJP)" and insert therefor --(S/P)--.

At claim 7, column 6, line 27, before the word "converter" delete "(PIS)" and insert therefor --(P/S)--.

At claim 10, column 6, line 45, before the word "converters" delete "(SIP)" and insert therefor --(S/P)--.

Signed and Sealed this
Eleventh Day of October, 2011

David J. Kappos
*Director of the United States Patent and Trademark Office*